April 9, 1940.  T. H. JENKINS  2,196,529

POURING HANDLE

Filed Nov. 3, 1938

Inventor:
Tazewell H. Jenkins.
by Wm. F. Freudenreich,
Atty.

Patented Apr. 9, 1940

2,196,529

UNITED STATES PATENT OFFICE 2,196,529

POURING HANDLE

Tazewell H. Jenkins, Chicago, Ill.

Application November 3, 1938, Serial No. 238,619

3 Claims. (Cl. 294—27)

The present invention has for its object to produce a simple and novel device by means of which a large bottle or other container may be provided with a handle and thus make it easy to pour liquids without requiring the use of more than one hand.

In carrying out my invention, I loop around the bottle or other article a flexible member provided with a handle by means of which the device may be contracted about the article so as firmly to hold the same. This handle may then be employed for transporting the article. Therefore, viewed in one of its aspects, the present invention may be said to have for its object to produce a simple and novel handled article carrier comprising a flexible member adapted to be tightened around the article.

Figure 1:
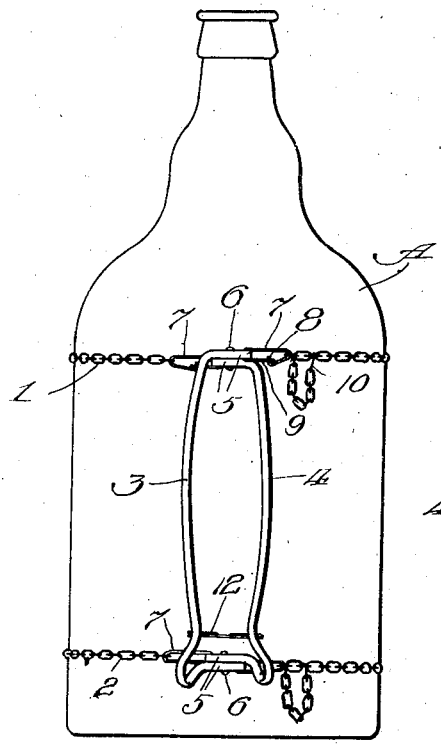
Figure 2:
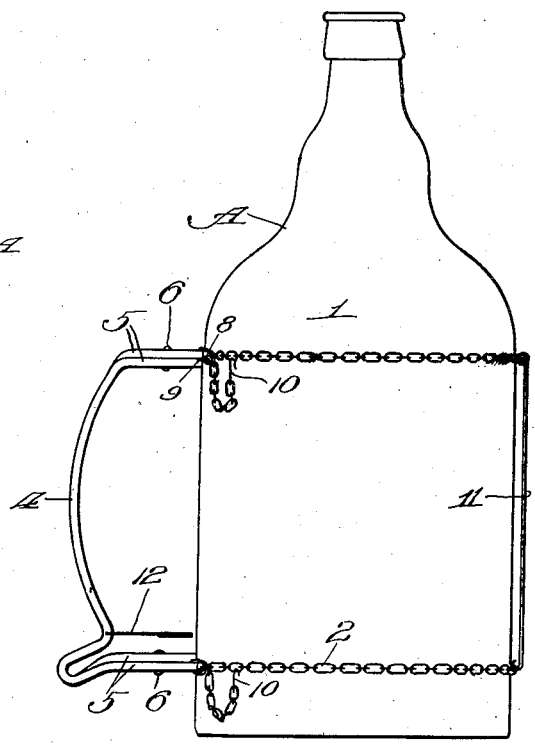
Figure 3:
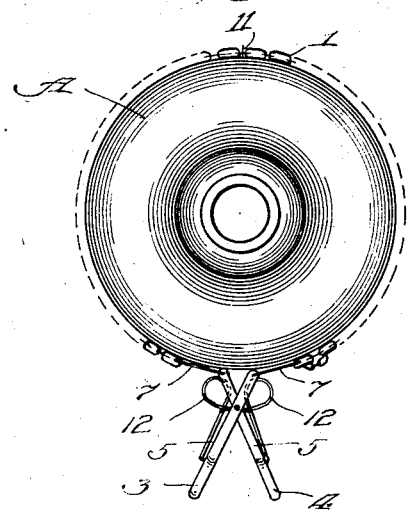
Figure 4:
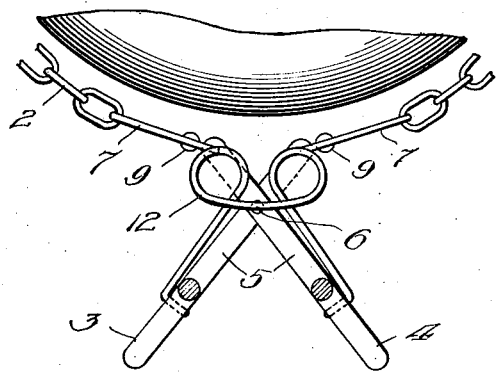

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figures 1 and 2 are elevational views of a bottle having one of my improved devices applied thereto, the two views being taken looking at the bottle from two directions at right angles to each other; Fig. 3 is a top plan view of the bottle and attachment, as shown in Figs. 1 and 2; and Fig. 4 is a plan view on a larger scale, showing only a fragment of the bottle, the handle being in section, and the flexible member being shown in an expanded condition so as to be loose on the bottle.

In order that a bottle or the like may be effectively held and manipulated so as to pour therefrom, any handle therefor should be fixed relatively thereto so as to function in the manner of a pitcher handle, for example. This can be accomplished by employing a long handle and fastening both ends to the bottle. The fastening may take the form of a wide band adapted to embrace the bottle; the ends being attached to the handle and being adapted to be drawn together or spread apart thereby, to tighten the band on the bottle for use or loosen the band for removal from the bottle. The effect of a wide band can be obtained with two pieces of chain, cord or the like, spaced apart from each other lengthwise of the bottle, and this is the construction which I have illustrated; 1 and 2 representing chains each of which is long enough to extend entirely around the largest bottle to be handled.

Associated with the chains 1 and 2 is a handle comprising two bar-like elements 3 and 4, which may be made from heavy wire; the ends of the members 3 and 4 being bent laterally to form similar arms 5, one pair on each of the handle members. Corresponding arms on the handle members cross each other and are pinned together, as indicated at 6, so that when the members 3 and 4 move toward or recede from each other, the free ends of the corresponding pairs of arms have similar movements. One end of the chain 1 is connected to the free end of one of the arms on the handle element 4, while the corresponding end of the chain 2 is secured to the free end of the other arm of that handle element. These connections may be permanent, if desired, or they may be in the form of wire links 7 which may be opened to detach the chains. The other ends of the chains are connected to the remaining arms of the handle device; these latter connections being preferably detachable so as to permit the effective links of the chains to be increased or decreased according to the size of the bottle. In the arrangement shown, these connections are by means of links 7 like those at the opposite ends of the chains; one longitudinal member of each of these links being divided between the ends thereof, and the wire ends thus produced being formed respectively in a hook 8 and an eye 9 for receiving the hook. By pressing the hook out of the eye, the link becomes open, and the link of the chain with which it happens to be engaged can be slipped off and the connection be shifted farther along the chain in one direction or the other. The ends of the chain, where the adjustments are to be made, are shown as terminating in hooks 10 which permit any unused portion of a chain to be caught in a loop by engaging the hook in one of the links of the main portion of the chain.

About halfway between the ends of the two chains, I place a strut 11 about as long as the handle. This strut, which may be a simple piece of stiff wire having at the ends eyes to surround elements of a pair of links in the two chains, serves to keep the two chains in parallel planes when they are tightened around the bottle, and thus makes it easy for the chains to place themselves in planes at right angles to the axis of the bottle upon being tightened.

Associated with the two-part handle is a spring 12 which tends normally to draw together the bar members of the handle and also to draw together the free ends of each pair of crossed arms. In other words, when the chains have been properly adjusted for length, and the two bars of the handle are spread apart far enough, the chains may be slipped down over the bottle and, upon releasing the handle, the spring will draw the chains tightly about the bottle. The effective lengths of the chain must always be such that the bar members 3 and 4 are spread apart somewhat when the device is tightened upon a bottle, as shown in Figs. 1 and 3. This insures that the spring is free to draw the chains into still smaller loops when the device is not on the bottle and therefore maintain a constant tightening effort on the chains while they remain on the bottle. In order to remove the device from the bottle, one need only spread the bar members 3 and 4 apart, as shown in Fig. 4, thereby spreading apart the points of connection between each chain and the handle, and loosening the chains.

In Figs. 1 to 3 the handle on the bottle A permits pouring from the latter by simply grasping the handle and tilting the bottle in the manner of a pitcher or teapot, for example. The tighter the grip on the handle, the more tightly are the chains drawn about the bottle, so that the handle cannot slip along or off the bottle. When it is desired to take off the handle, the bar members 3 and 4 are spread apart, as in Fig. 4, loosening the chains and permitting them to drop off the bottle or the bottle to be lifted out of their embrace. To again apply the device to the bottle, the bar members of the handle are spread to make the chain loops large enough to pass easily over the same. Then, upon releasing the spreading pressure on the handle, the spring comes into play to force the bar members 3 and 4 together and tighten the chains about the bottle. The strut 11 holds the chains apart while they are being applied about the bottle. For a larger or smaller bottle, the effective lengths of the chains are varied correspondingly as heretofore explained.

While the principal purpose of my invention is to provide a large bottle, such as indicated in the drawing at A, for example, with a handle to permit pouring therefrom in the same manner as from a pitcher, my invention is not limited to this use but may serve as a handle for any article or as an article or bundle carrier.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In combination, two U-shaped wire handle members having relatively short arms, corresponding arms of the said members crossing each other and being pinned together to permit the closed ends of said members to swing from and toward each other, two chains each connected at one end to one of the arms of one of said members, and a device on each arm of the second of said handle members for detachable engagement with the other end of one of said chains.

2. In combination, two U-shaped wire handle members having relatively short arms, corresponding arms of the said members crossing each other and being pinned together to permit the closed ends of said members to swing from and toward each other, two chains each connected at one end to one of the arms of one of said members, a device on each arm of the second of said handle members for detachable engagement with the other end of one of said chains, and a spring acting on said handle members in a direction tending to move the connecting pieces between the arms thereof toward each other.

3. In combination, two U-shaped wire handle members having relatively short arms, corresponding arms of the said members crossing each other and being pinned together to permit the closed ends of said members to swing from and toward each other, two chains each connected at one end to one of the arms of one of said members, a device on each arm of the second of said handle members for detachable engagement with the other end of one of said chains, a spring acting on said handle members in a direction tending to move the connecting pieces between the arms thereof toward each other, and a wire strut about as long as the said connecting pieces extending between and connected at its ends to the chains at points between the ends of the latter.

TAZEWELL H. JENKINS.